Patented June 20, 1933

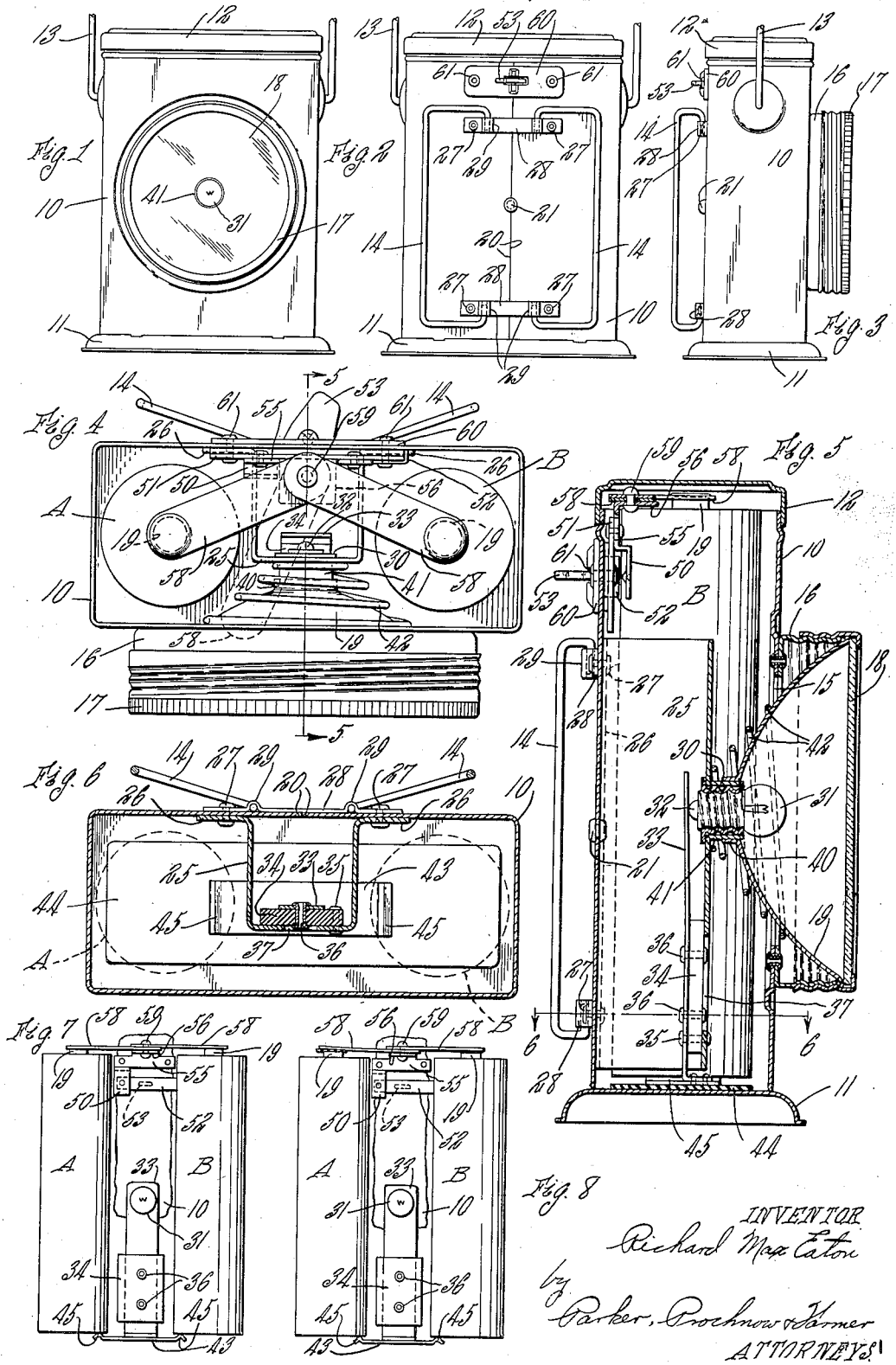
June 20, 1933.    R. M. EATON    1,914,970
PORTABLE ELECTRIC ILLUMINATING DEVICE
Filed Nov. 18, 1931

1,914,970

UNITED STATES PATENT OFFICE

RICHARD MAX EATON, OF NIAGARA FALLS, NEW YORK, ASSIGNOR TO NIAGARA SEARCHLIGHT COMPANY, INC., OF NIAGARA FALLS, NEW YORK

PORTABLE ELECTRIC ILLUMINATING DEVICE

Application filed November 18, 1931. Serial No. 575,807.

This invention relates to portable electric illuminating devices or lanterns in which primary batteries are used as a source of electric power.

The objects of this invention are to provide an illuminating device of this kind in which a plurality of blanks of battery cells is contained, and which device is arranged so that current may be taken from one bank or from the several banks connected in parallel; also to provide a lantern of this kind with means of novel construction for holding the battery cells in correct relation in the housing of the lantern; also to improve the construction of housings for lanterns of this kind; also to improve portable electric illuminating devices of this type in other respects hereinafter specified.

In the accompanying drawing:

Figs. 1, 2 and 3 are respectively a front, rear, and side elevation of a lantern embodying this invention;

Fig. 4 is a top plan view on an enlarged scale of the lantern with the top or cover removed therefrom;

Fig. 5 is a central sectional elevation of the lantern on line 5—5, Fig. 4;

Fig. 6 is a sectional plan view thereof, on line 6—6, Fig. 5;

Figs. 7 and 8 are elevations of the banks of cells and the current carrying parts of the lanterns (the housing being omitted), Fig. 7 showing the banks connected in parallel, and Fig. 8 showing one of the banks in open circuit position.

The housing of the lantern or illuminating device may be of any suitable or desired form, that shown including a body portion 10 of substantially rectangular cross section having a base 11 which is secured to and closes the lower end of the body portion 10, a lid 12, which is removably held on the upper open end of the body, a bail 13 by means of which the lantern may be suspended and a pair of handles 14 hinged or pivoted to the rear side of the lantern. The front of the lantern is provided with an aperture 15 about which a reflector housing 16 is secured, this housing having a bezel or retaining ring 17 secured to the outer portion thereof, which holds a transparent disk or lens 18, and a reflector 19 in operative relation to the lantern.

The housing of the lantern is preferably of such size that at least two banks of battery cells A and B may be contained therein, the lantern shown being so arranged that the two banks are arranged in opposite sides of the lantern housing. Each bank may include one or more cells, and when more than one cell is used in a bank, the cells may be arranged one above the other and may be contained in a tube or cylinder or paper or other insulating material, the upper terminal of a lower cell contacting with the bottom of the cell above to form a series connection between the cells of a tier or bank. Any other arrangement of the cells or primary batteries may be employed, if desired, and obviously, more than two banks of cells could be used.

The lantern housing is preferably made of sheet metal and may be formed in any suitable or desired manner. In the construction shown, the sheet metal of the body portion 10 has upright edges 20 which meet in approximately the middle of the back of the lantern and are unseamed, for example, these edges may form a butt joint. In order to hold the two abutting edges of the metal in place, a plurality of securing means are preferably employed, as will be hereinafter described, including a rivet 21 arranged through a hole at the meeting edges of the housing, which rivet serves the purpose of holding the two edges of the housing in alinement. A housing of other construction may be employed, if desired.

The housing of the lantern is provided in the intermediate portion thereof with an upright channel, spacing or bridge member 25, which serves a number of different purposes. In the particular form in which this member is shown, it is made of sheet metal bent into substantially U-shape and the ends thereof are provided with flanges 26 secured to the rear wall of the lantern housing. The intermediate portion of the channel extends toward the front wall of the housing and this forms a partition to form spaces in the sides of the housing in which two banks of cells A and B are confined. The bridge or spacing member 25 may be secured to the rear wall of the housing 10 of the lantern by means of rivets 27 which also connect plates 28 to which the handles 14 are hinged, these plates, in the construction shown, being provided with integrally formed or bent lugs 29 into which the ends of the handles 14 enter to permit these handles to be swung into inoperative positions lying close to the rear wall of the lantern, or outwardly into operative positions. The bridge member 25, together with the strips or plates 28, consequently, also serves the purpose of holding the adjacent edge portions 20 of the housing in correct relation, in conjunction with the rivet 21.

The bridge member 25 also serves as a support for a lamp socket 30, which is secured on the front wall of the bridge member, and in which a lamp bulb 31 may be secured. The central terminal 32 of the lamp extends inwardly into the bridge member 25 into a position to engage with a spring contact member 33, the lower portion of which is suitably secured to an insulating block or member 34 secured by means of rivets 35 or by other means to the bridge member 25. Other rivets 36 secure the spring member 33 to the insulating block 34, as shown in Figs. 6, 7 and 8, one end of each of these rivets extending through a slot 37 formed in the front face of the channel member 25, thus avoiding an electrical connection between this spring contact member 33 and the channel member 25, except through the filament of a lamp 31, the rivets 35 being arranged so as not to contact with the spring contact member 33.

The reflector 19 is preferably provided at its inner end with a substantially cylindrical flange 40 which is slidable on a sleeve 41 surrounding the lamp socket 30, and a spring 42 normally urges the reflector 19 outwardly toward the retaining ring 17. Consequently, by turning the retaining ring about its screw threaded connection with the reflector housing 16, the reflector may be moved lengthwise of its axis to focus the same with reference to the filament of the light bulb 31 or to move the reflector out of focus to diffuse the reflected light. Other means for adjustably mounting the reflector with reference to the light bulb may, however, be employed, if desired.

The contact member 33 preferably contacts with the lower ends of the cell banks A and B, and for this purpose, the lower end of the contact member 33 is secured to a horizontal plate or bar 43, and an insulating plate or layer 44 is arranged between the base 11 of the housing and the conductor plate 43. This conductor plate 43 is intended to engage the outer metal containers of the cells and in order to prevent damage to the batteries by reversing one of the banks of batteries, the plate 43 is made short enough so that the ends thereof may contact with the edge portions of the bottoms of the cells. If one of the banks is inverted, the carbon terminal 19 could not contact with the plate 43, so that a short circuiting of the two banks of cells could not result. 45 represents upwardly extending projections on the ends of the conductor plate 43 for ensuring contact between this plate and the banks of cells.

The upper terminals of the batteries are preferably connected with the housing 10 of the device through the medium of a switch, so that when the upper terminals are thus grounded on the housing, current will flow through the housing and bridge member 25 to the lamp socket and the filament, and consequently, through the lamp terminal 32 and conductor 33 to the other battery terminal. This switch may be of any suitable construction, for example, similar to that shown in my co-pending application, Serial No. 569,879, filed October 20, 1931, according to which one of the switch contacts 50 is mounted on an insulating plate 51, suitably secured on the housing of the lantern. A spring plate 52, which is connected with or grounded on the lantern housing, is mounted on the insulating plate 51 in such a manner as to normally lie out of contact with the switch contact member 50, unless the spring is moved into engagement with this member by means of the switch lever or cam 53. The insulated switch contact member 50, in the particular construction shown, forms a part of a plate 55 secured on the insulating plate 51 and having a horizontally extending projection or lug 56, through which contact may be made with the upper terminals 19 of the banks of battery cells.

In accordance with this invention, the contact with the battery cells may be made by means of spring arms 58 pivotally mounted on the arm 56 by means of a rivet 59 or other suitable pivot member. These spring arms 58 are so formed that they will normally press downwardly upon the battery contact terminals 19, and thus complete a circuit from the banks of cells to the switch contact member 50. Each of these arms may be swung independently of the other arm, and the arms may be swung about their pivots into positions to press against the contact 19, as indicated in full lines in Fig. 4, or either spring member may be swung into the dotted line position in Fig. 4, in which this member will permit a bank of cells to be removed.

When the two spring contact members 58 are in the positions indicated by the full lines in Fig. 4, the parts will be electrically connected, as indicated in Fig. 7, in which both banks A and B are connected in parallel, so that current from both banks passes to the light bulb when the switch is closed. When it is desired to use only one bank of cells and to hold the other bank in reserve, or as a spare ceil, this is preferably done, as indicated in Fig. 8, in which a piece of paper or other insulating material is inserted between the spring arm 58 and the terminal 19 of the adjacent bank of cells. In this case, current is taken only from the other bank of cells. In either case, the spring arms hold both banks of cells in their correct positions in the housing. The arrangement of the spring members, consequently, makes it possible for the user of the lantern to either use only one bank of cells at a time and to carry the other bank of cells in reserve, or if desired, the two banks of cells may be connected in parallel. For long continued use, the parallel arrangement is, of course, more desirable, since by this arrangement the current drain on the batteries is reduced by one-half, in case two banks of cells are used, and the burning period of the lantern is increased to approximately three times that of a single bank of cells.

The switch lever or cam 53 is pivoted on a switch plate 60 which, in the construction shown, is secured to the rear wall of the lantern housing by means of rivets or other fastening means 61 at opposite sides of the butt joint 20, so that this switch plate holds the edges of the body portion at the upper portion of the butt joint in correct relation to each other. Hence by means of the switch plate, the straps 28 of the handles, the bridge member, rivet 21 and the bottom of the housing, the abutting edges of the body portion can be held in correct relation to each other, so that the usual seam in the body portion of the housing can be dispensed with which not only saves the expense of making the seam and its unsightly appearance, but also avoids the inconvenience of the seam in securing various parts of the lantern to the rear wall thereof.

The lantern described has the advantage that it is of strong and rugged construction and of a size that is conveniently carried or handled and can be produced by the minimum of material and labor. The bridge member 25 serves the several purposes of reinforcing or bracing the back wall of the housing against the strains to which it is subjected by the handles 14, and also makes it unnecessary to form a seam at the rear wall of the housing. The bridge member also serves as a spacing member or partition for confining the banks of cells in the sides of the housing, and furthermore, supports the light bulb and the connections thereto and partly supports the reflector 19. The lantern, furthermore, can be used either with a parallel arrangement of the banks of cells or with the carrying of one battery unit in reserve.

I claim as my invention:

1. In a portable electric illuminating device having a housing containing a primary battery, a switch on said housing including a terminal electrically connected with said housing and a terminal insulated therefrom, said insulated terminal having a portion extending adjacent to one end of said battery and to one side thereof, and a spring arm pivoted on said portion of said terminal and adapted to swing about its pivot into a position over said battery to make contact therewith and into a position at one side of said battery to permit removal of the same from said housing.

2. In a portable electric illuminating device having a housing, a plurality of separate banks of battery cells arranged in said housing, a switch on said housing including a terminal electrically connected with said housing, and a terminal insulated therefrom, said insulated terminal having a portion extending adjacent to the upper ends of said cell banks, a plurality of spring arms pivoted on said portion of said terminal, each of said arms being adapted to swing into engagement with a contact of a cell bank, said cell banks being connected in parallel when said arms contact with said battery terminals.

3. A housing for an electric lantern having spaces in the opposite sides thereof for battery cells, a bridge member of substantially channel shaped form arranged vertically on the middle portion of said housing and secured at its edges to the rear wall of said housing for reinforcing the same, handles for said housing, means for securing said handles to the rear wall of said housing and to said bridge member and securing said wall and bridge member together, a lamp socket secured to the front portion of said bridge member, and a contact member mounted on said bridge member for contacting with a light bulb in said socket.

4. A housing for an electric lantern, said housing including a body portion made of sheet metal and having edges meeting in an unseamed joint at the rear wall of said housing, an upright bridge member of substantially U-shaped cross section and having its edge portions secured to said rear wall at opposite sides of said joint to reinforce said rear wall, a handle secured to the rear wall of said housing, straps for holding said handle in place and extending across said joint, and fastening means extending through said straps, said rear wall and said edge portions of said bridge member, said bridge member cooperating with the walls of said housing to form spaces for battery cells.

5. A housing for a portable electric lantern having a body portion made of sheet metal, the edges of which form an unseamed joint at the rear wall of said housing, a handle secured to said rear wall at opposite sides of said joint, a switch arranged above said handle and including a plate straddling said joint and secured to said body portion at opposite sides of said joint, and a bridge member arranged in the interior of said housing and secured thereto at opposite sides of said joint and forming with the inner walls of said housing a space for battery cells.

6. An electric lantern having a housing having means for separately supporting a plurality of banks of battery cells of equal initial voltage, an electric light bulb, a circuit including a switch for connecting said banks of cells with said bulb, and movable parts in said circuit independent of said switch which in one relative position of said parts connect all of said banks of cells in multiple in said circuit and in another relative position thereof to connect a selected bank of cells singly in said circuit.

7. A portable electric illuminating device, including a housing having an open upper end adapted to be closed by a lid, an electric light bulb carried by said housing, a plurality of banks of battery cells adapted to be inserted lengthwise into said housing from the upper end thereof, each of said cell banks including a terminal centrally located at one end thereof and a shell forming the other terminal, contact means at the bottom of said housing for contacting with the shells of said banks, said housing being provided with spaces confining said banks in their operative positions in said housing, a plurality of contact spring arms in the upper portion of said housing adapted to yieldingly hold said banks against lengthwise movement in said housing and connecting similar terminals of said banks in parallel, and a circuit including said spring arms and said electric light bulb for carrying current from said banks to said bulb, and an insulating element insertible between either one of said spring arms and the adjacent terminal of its associated cell bank, to render the connection between said spring arm and that bank of battery cells inoperative electrically while said spring arm continues to hold said bank of cells in operative position, thereby enabling one or more of said cells to be carried in reserve.

8. In a portable electric lantern, a housing, a pair of opposed cell banks arranged in spaced relation one at each of said housing, a tubular spacing member secured to a wall of said housing and extending upwardly between and separating said cell banks, an electric socket mounted in said spacing member and having a light bulb therein, a reflector in a side wall of said casing in operative relation to said light bulb, an insulating block secured to the inner face of said spacing member, a contact arm mounted on said block and having one end extending into engagement with a contact of said light bulb and its other end secured to a contact strip extending into electrical engagement with an end of each cell bank, said strip being mounted on and insulated from said housing, and contact arms mounted upon said housing and engaging the opposite end of said cell banks for completing the circuit from said cells to said lamp and which bear upon said cells and hold them firmly against said contact strip at said other end of said banks, said arms being pivotally mounted so that they may be swung to a position at one side of said cell banks to facilitate the removal of the latter from said housing.

RICHARD MAX EATON.